US012341405B2

(12) United States Patent
Ramadas et al.

(10) Patent No.: US 12,341,405 B2
(45) Date of Patent: Jun. 24, 2025

(54) BEARINGLESS ROTATING ELECTRIC MACHINE WITH FIELD WEAKENING

(71) Applicant: Wisconsin Alumni Research Foundation, Madison, WI (US)

(72) Inventors: Bharat Ramadas, Mountain View, CA (US); Eric Severson, Middleton, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 314 days.

(21) Appl. No.: 17/941,260

(22) Filed: Sep. 9, 2022

(65) Prior Publication Data

US 2024/0088747 A1 Mar. 14, 2024

(51) Int. Cl.
*H02K 7/09* (2006.01)

(52) U.S. Cl.
CPC .......... *H02K 7/09* (2013.01); *H02K 2213/03* (2013.01)

(58) Field of Classification Search
CPC .......... H02K 7/09; H02K 21/16; H02K 1/278; H02K 2213/03
USPC ....................................................... 310/90.5
See application file for complete search history.

(56) References Cited

U.S. PATENT DOCUMENTS

| 6,057,622 | A | * | 5/2000 | Hsu | H02K 21/046 310/407 |
| 6,130,494 | A | * | 10/2000 | Schob | H02K 7/09 310/90.5 |
| 6,465,923 | B2 | * | 10/2002 | Amrhein | F16C 32/0493 310/179 |
| 7,884,518 | B2 | * | 2/2011 | Blessing | H02K 21/029 310/120 |
| 7,960,888 | B2 | * | 6/2011 | Ai | H02K 21/24 310/191 |
| 9,882,442 | B2 | * | 1/2018 | Sakamoto | H02K 1/2796 |
| 10,833,557 | B2 | | 11/2020 | Severson | |
| 2008/0100163 | A1 | * | 5/2008 | Storaasli | H02K 7/09 335/229 |
| 2013/0229078 | A1 | * | 9/2013 | Garber | H02K 7/025 310/90.5 |
| 2015/0171674 | A1 | * | 6/2015 | Lee | H02P 25/22 310/46 |
| 2019/0356260 | A1 | | 11/2019 | Severson | |

FOREIGN PATENT DOCUMENTS

| EP | 0990296 A1 | 4/2000 |
| JP | 2008289283 A | 11/2008 |
| WO | 2017024119 A1 | 2/2017 |

OTHER PUBLICATIONS

International Search Report for PCT/US2023/030228 dated Nov. 28, 2023.
Bharat Ramadas et al.; "Suspension Force Design Guidelines for Bearingless Permanent Magnet Machines." In 2021 IEEE Energy Conversion Congress and Exposition (ECCE), pp. 4554-4561. IEEE, 2021.

* cited by examiner

*Primary Examiner* — Alex W Mok
(74) *Attorney, Agent, or Firm* — Boyle Fredrickson, S.C.

(57) ABSTRACT

A bearingless rotating electric machine provides a rotor-stator architecture that decouples motor torque fields from motor suspension fields greatly simplifying field weakening such as affects torque fields, without detrimental effect on rotor suspension.

20 Claims, 2 Drawing Sheets

BEARINGLESS ROTATING ELECTRIC MACHINE WITH FIELD WEAKENING

STATEMENT REGARDING FEDERALLY SPONSORED RESEARCH OR DEVELOPMENT

This invention was made with government support under W911NF-20-2-0181 awarded by the ARMY/ARO. The government has certain rights in the invention.

CROSS REFERENCE TO RELATED APPLICATION

BACKGROUND OF THE INVENTION

The present invention relates to rotating electric machines and in particular to bearingless electrical machines in which electromagnetic interaction between the stator and rotor both suspend and turn the rotor.

Electric machines are inherently rugged and reliable as they have only a single moving part, the rotor. With significant strides made in power electronics and motor technology in recent years, the contact-based, mechanical bearing system used to mount machine rotors has become the single most failure-prone part of an electric drive system, with certain studies estimating that up to 60% of motor failures are bearing related.

Bearingless motors, in which the rotor is magnetically suspended by the stator fields, are a promising solution to this problem, largely eliminating bearing wear and failure. Nevertheless, bearingless motors have not found widespread use in industrial high-speed and ultra high-speed applications where they might be expected to be particularly advantageous. One feature limiting the adoption of bearingless motors is that these machines generally require a high DC bus voltage in order to avoid the need for field weakening normally used to obtain high speeds. Field weakening is a technique by which stator fields are adjusted to have a component opposing the permanent magnet rotor field. This approach sacrifices some torque in obtaining high-speed operation while operating within the limitations of the DC bus voltage.

In a bearingless motor, field weakening would be expected to adversely affect the magnetic field holding the rotor in suspension, thus risking the possibility of a collision between the levitated rotor and stator or, alternatively, requiring that the motor be over dimensioned with a higher safety factor, resulting in a machine that is unnecessarily large, counter to the desire for high power density. This same coupling between motor torque/field weakening and rotor suspension also complicates the process of controlling the rotor position during different torque demands.

SUMMARY OF THE INVENTION

The present inventors have developed a motor/generator geometry that substantially reduces and theoretically eliminates the coupling between rotor suspension force and torque, simplifying motor/generator control and isolating rotor suspension from the effects of field weakening.

In one embodiment, the invention provides an electric drive system including a rotating electric machine providing a rotor mounted for rotation with respect to a stator and a drive communicating with and energizing the rotating electric machine. The motor drive provides electrical currents to the stator to: (a) provide a levitating force to the rotor supporting the rotor during rotation; and (b) provide torque to the motor and (c) provide a field weakening to the rotor to weaken the permanent magnet field when required to rotate above threshold RPM. The rotating electric machine provides physical measurements conforming to the following formula:

$$\delta_e/r_{si} \geq 0.2/\min(p,p_s)$$

where:
$\delta_e$ is the effective air gap affecting the stator fields;
$r_{si}$ is the radius of the inner stator bore; and
$\min(p,p_s)$ is the minimum of the number of motor pole pairs p and suspension pole pairs $p_s$ of the bearingless motor as controlled by the motor drive.

It is thus a feature of at least one embodiment of the invention to greatly simplify the process of field weakening in electrical machines having magnetically suspended rotors through a rotor and stator design that largely isolates rotor suspension fields from the influence of the weakened torque fields.

The effective air gap may be a gap of air needed to produce a same effect on the stator fields as provided by the rotating electric machine, assuming the structure outside of the air gap is a high relative permeability material having a relative permeability of greater than 20.

It is thus a feature of at least one embodiment of the invention to provide a design criteria that is applicable to a wide variety of motor designs where an effective air gap can be computed or estimated.

When the rotor is a surface permanent magnet motor having magnets exposed on the face of the rotor facing the stator, the effective air gap may be approximated by:

$$\delta_e = \delta + d_m/\mu_r$$

where:
$\delta$ is a radial gap between a surface of the rotor-mounted permanent magnets and the stator;
$d_m$ is a radial thickness of the magnets; and
$\mu_r$ is the relative permeability of the permanent magnet material.

It is thus a feature of at least one embodiment of the invention to provide a simplified design criterion for surface permanent magnet rotors.

The threshold RPM may be an RPM at the maximum achievable RPM at a given DC bus voltage without field weakening It is thus a feature of at least one embodiment of the invention to provide RPM increases beyond what might be expected from the voltage limitations of the drive system.

The field weakening may be produced using stator currents reducing a magnetic field along a pole of the rotor.

It is thus a feature of at least one embodiment of the invention to allow modification of the rotor magnetic field using stator control with reduced effect on magnetic levitation.

The controller may provide vector control of the currents in the stator having D and Q components and wherein the field weakening controls the D current independently of the Q current.

It is thus a feature of at least one embodiment of the invention to provide a field weakening that minimizes torque loss.

In some embodiments, the rotating electric machine may have a pole architecture selected from the group consisting of a six slot stator and one pole pair rotor, and a thirty-six slot stator and two pole rotor.

It is thus a feature of at least one embodiment of the invention to identify motor designs that are particularly well suited for field weakening using this invention.

The electrical machine may be a motor, and the drive may further apply a torque force to the rotor to rotate the rotor against a resisting load.

It is thus a feature of at least one embodiment of the invention to provide for field weakening in high-speed electric motors having rotor suspension.

These particular objects and advantages may apply to only some embodiments falling within the claims and thus do not define the scope of the invention.

DETAILED DESCRIPTION OF THE PREFERRED EMBODIMENT

Figure 1:
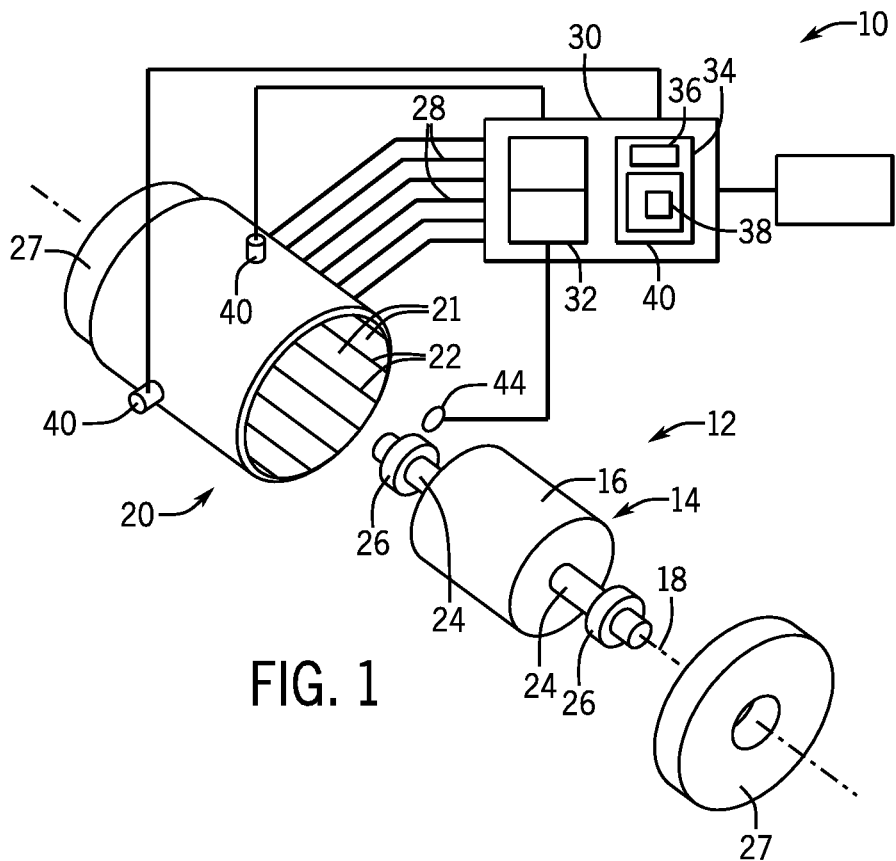
FIG. 1 is a simplified exploded diagram of an example of a bearingless electric control system employing a drive and a rotating electric machine with a permanent magnet rotor.

Referring now to FIG. 1, a bearingless machine control system 10 may include a rotating electric machine 12 (such as a motor or generator) having a rotor 14, for example, holding a set of magnets 16 spaced angularly about a rotor axis 18 to define a pole pair count p, each pole of the count generally formed from pairs of magnets. Generally, the pole pair count p will be an angular periodicity (the dominant spatial harmonic) of field reversals around the rotor 20.

In the following example, the magnet 16 are "surface" magnets mounted to the surface of a support structure of the rotor 14, typically a material of high magnetic permeability such as a ferromagnetic material having a relative permeability of greater than 20 (typically in excess of 100) in contrast to the relative permeability of the magnets 16 which may be on the order of one and typically less than 2. More generally, the invention is not limited to surface permanent magnet rotors but is also applicable to buried or interior permanent magnet rotors in which the permanent magnets are fully or partially covered by a ferromagnetic material.

The rotor 14 may fit concentrically within a stator 20, the latter providing a set of windings 21 within slots around stator teeth 22 spaced angularly about the axis 18, the number of teeth also defining a slot number. The number of teeth (or slots) in the simplest case will match the number of rotor poles; however, multiple, or non-integer numbers of teeth may be associated with each motor pole in some motor designs and the present invention is also applicable to slot-less or tooth-less stators. Typically, the teeth 22 will be constructed of a high relative permeability material such as iron or steel having a relative permeability of greater than 20.

The rotor 14 may have an axial shaft 24 aligned with the axis 18 the latter defining an axis about which the rotor 14 rotates within the stator 20. The axial shaft 24 allows for the output of rotational power to a load, for example, a turbine blade, or the receipt of rotational power from an external mechanical source such as a wind turbine.

The bearingless machine control system 10 attached to the rotating electric machine 12 will operate to support the rotor 14 during rotation through the use of stator-generated magnetic fields. This magnetic support of the rotor 14 may be its primary source of support during rotation, consistent with the designation "bearingless" normally applied to such rotating machines. Nevertheless, the invention contemplates that the shaft 24 will typically have ancillary bearings 26, providing axial and/or radial restraining forces during rotation of the rotor 14 at low speeds and/or when the rotor 14 is at rest. These ancillary bearings 26 may be conventional roller or ball bearings, magnetic bearings, and other bearing types as is understood in the art, and may be supported, for example, by motor bearing sleeves in end-caps 27 of the rotating electric machine 12 stationary with respect to the stator 20. In most cases, ancillary bearings 26 will experience negligible radial forces during operating speeds of the rotor 14 greatly reducing their wear and failure. Nevertheless, the invention contemplates use with rotating electric machines 12 where both the ancillary bearings 26 and the stator-generated fields share the function of resisting radial forces, with the latter, for example, being used to suppress rotor vibrations or the like.

For clarity of description, the detailed discussion of the bearingless machine control system 10 will now consider the example of a motor as the rotating electric machine 12, it being understood that the same principles and construction can be applied generally to both motors and electrical generators where field weakening in both cases permits a flexible trade-off between operation speed of the rotor and maximum drive voltage or maximum generated voltage.

Referring still to FIG. 1, in an example when the rotating electric machine 12 is a motor, the windings 21 of the stator 20 will be connected to a controller 30 providing an inverter 32 able to synthesize an arbitrary set of voltage-constrained AC waveforms, for example, three-phase power, on connecting lines 28, for example, using pulse width modulation. The inverter 32 may be controlled by an electronic computer 34, for example, including one or more processors 36 executing a stored program 38 held in computer memory 40 operating to control the waveform synthesis and other aspects of the motor operation including torque, speed, acceleration, and deceleration profiles, and the like.

In this capacity, the controller 30 may also receive information from rotor displacement sensors 42 tracking radial displacement of the rotor 14 (in directions perpendicular to the axis 18) to provide feedback control of rotor position for the purpose of suspension of the rotor 14. The rotor displacement sensors may, for example, be Hall effect or optical proximity sensors or may be implemented through stator magnetic field measurement techniques.

In addition, the controller 30 may receive information from rotational position sensor 44 for detecting the angular position of the rotor 14 used for the above described control of motor operation (e.g., speed and torque control) and which may be a rotational encoder or the like attached to the shaft 24 monitors that detect variations in rotor magnetic fields. Alternatively, the sensing may be implemented through stator magnetic field measurement techniques known in the art.

Figure 2:
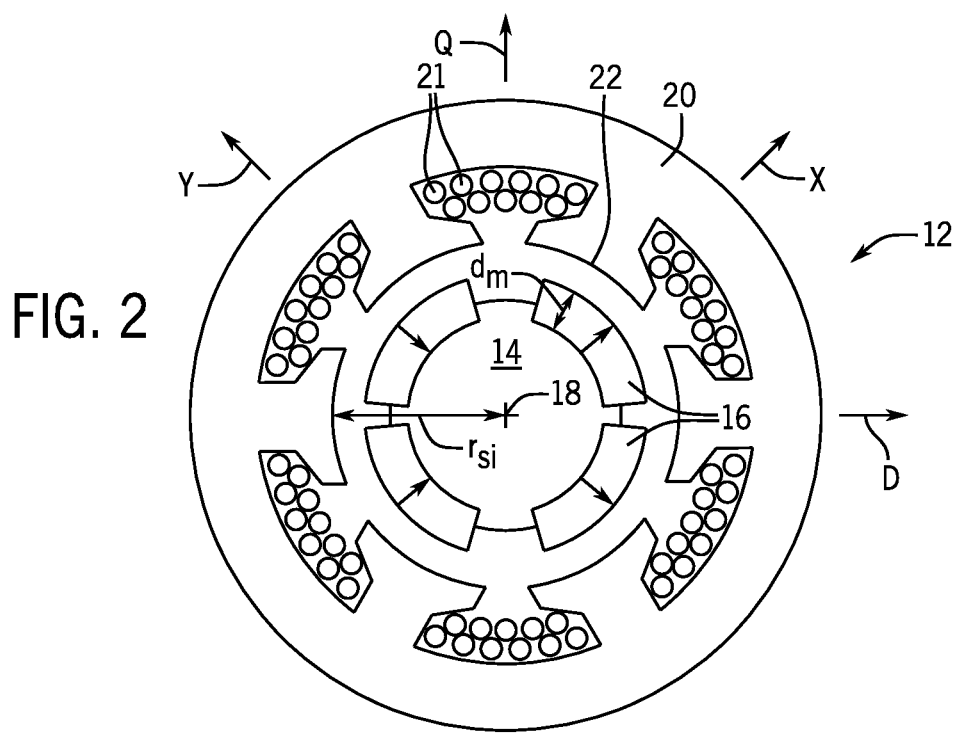
FIG. 2 is a cross-section along line 2-2 of FIG. 1 of the rotor showing various dimensions relevant to the present invention.
Figure 3:
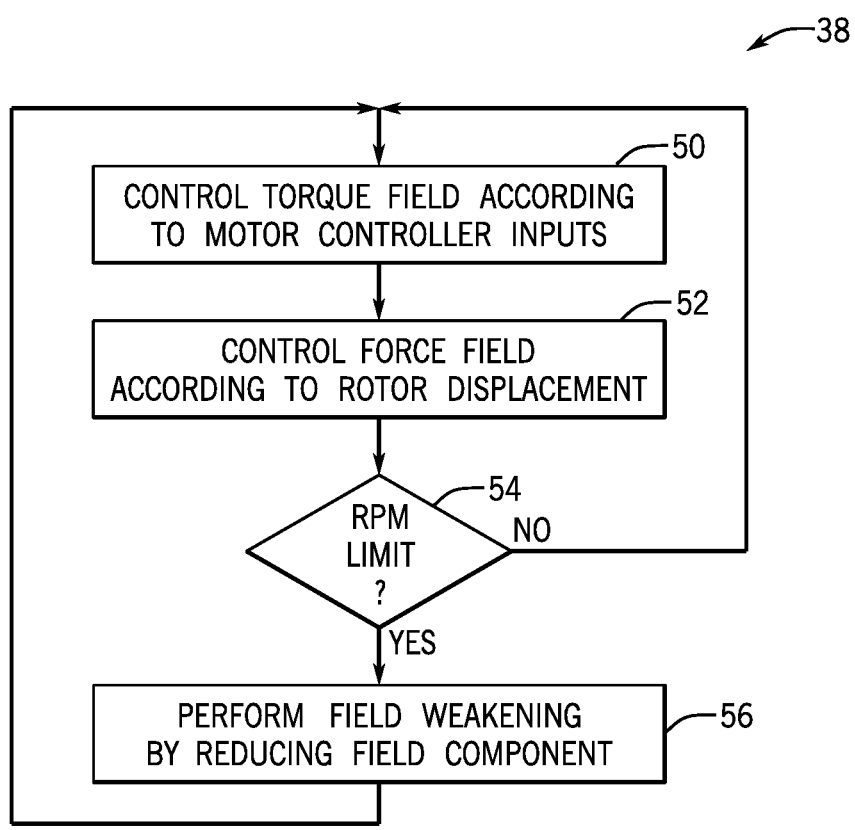
FIG. 3 is a flow chart of the processes performed by the controller of FIG. 1.

Referring also to FIGS. 2 and 3, generally the controller 30 operating according to the program 38 will synthesize complex AC voltage waveforms for the stator windings that provide two different functions of first applying a torque on the rotor (torque) and second of providing a positioning or suspension force on the rotor, for example, against the radial forces of gravity, rotor eccentricity, or the like As indicated by process block 50, for the purpose of controlling torque, the controller 30 may implement a vector controller of a type that can generate, for each motor pole, a rotating magnetic field having a D and a Q component where the D component will generally be aligned with a rotor pole and the Q component will be 90° displaced therefrom. As is understood in the art, in this synthesis technique, D and Q are referenced to the rotating framework of the rotor 14 obtained through sensor 44 or sensorless techniques. By adjusting the D and Q components of t the stator fields, known motor control techniques can be enlisted to dynamically control torque and speed during motor acceleration deceleration and changing load condition.

As indicated by process block 52, the controller 30 will also generate time domain current waveforms to control the airgap fields to create both torque and force. The applied torque spins the rotor while the radial force is controlled such that the rotor is magnetically levitated. This airgap field can be described by perpendicular X and Y components generally evolving in phase with respect to the D and Q components. At any given time the fundamental stator suspension field will exhibit an angular periodicity (the dominant spatial harmonic) of field reversals around the stator 20 defining a suspension pole-pair count $p_s$. This value $p_s$ will differ from p by one (plus or minus 1) in order to produce this net radial force.

The bearingless motor torque and force can be created either by two separate windings or by a single combined winding.

An analysis of the synthesis of these waveforms and this control process is described in more detail in in B. Ramaclas and E. L. Severson, "Suspension Force Design Guidelines for Bearingless Permanent Magnet Machines," 2021 IEEE Energy Conversion Congress and Exposition (ECCE), 2021, pp. 4554-4561.doi:10.1109/ECCE47101.2021.9595597 and it citations all hereby incorporated by reference in its entirety.

During operation controller 30, as indicated by decision block 54 and process block 56, may also implement a field weakening control strategy to provide increased rotational speed of the rotor at upper RPM limits. In this control strategy, a predetermined rotational speed may be determined, for example, being an RPM value at which the AC stator waveform reaches or closely approaches its maximum output according to the physical limitations of the inverter 32 and a particular load. Alternatively a simple RPM limit may be used. This predetermined rotational speed may be precomputed or may be adjusted dynamically by sensing voltage of the DC bus.

When this threshold is detected, the D field is reduced (effectively reducing the rotor permanent magnet field) from its control value determined at process block 50 and will oppose the magnetic field of the rotor 14. This field weakening may be conducted entirely with changes in the D field typically without changing the Q value per process block 56. The field weakening results in a reduction in torque because it requires power that would normally be used for torque to be diverted to field weakening. Nevertheless, field weakening increases rotational rate by effectively reducing the back EMF caused by the field of the permanent magnet rotor. The weakening of the D field effectively reduces the strength of the magnetic pole of the rotor 14 because of their alignment overcoming the fact that the magnetic field of the rotor cannot be directly controlled because it is generated by permanent magnets. Continued and increasing field weakening is provided for as speed is increased beyond this threshold.

Referring still to FIG. 2, present inventors have determined that field weakening can be conducted without significantly affecting the stator force by a proper selection of physical parameters of the rotating electric machine 12. These parameters essentially decouple the stator force from the stator torque allowing field weakening that affects the stator torque to be conducted without affecting the force and hence rotor suspension.

Perfect decoupling will occur when the following physical constraints on the motor are realized:

$$\delta_e/r_{si} \geq 1/\min(p,p_s) \tag{1}$$

where:
  $\delta_e$ is the effective air gap affecting the stator fields extending toward the rotor from the stator;
  $r_{si}$ is the radius of the inner stator bore determining the example by the inner surface of the teeth 22; and
  $\min(p,p_s)$ is the minimum of the number of motor pole pairs p and suspension pole pairs $p_s$ of the bearingless motor as controlled by the motor drive. In the particular example of FIG. 2, p is 1 and $p_s$ would be 2 and hence $\min(p,p_s)$ would be 1.

The effective air gap is equivalent to a gap of air needed to produce the same effect on the stator fields as that provided by the bearingless motor under consideration and thus does not necessarily describe an actual air gap but takes into account the various relative permeabilities of the materials along the flux path of the stator 20. In this way formula (1) is not limited in application to surface permanent magnet motors but also applies to buried magnet motors where the magnets are positioned, for example, beneath an intervening layer of high relative permeability material such as iron or steel. The effective air gap can be obtained by modeling a given motor design and summing the relative permeability of the materials along the paths of flux and decomposing the sum into given distances of air and high permeability material that would be equivalent, or by empirical measurement.

For many designs, the effective air gap can be approximated by:

$$\delta_e = \delta + d_m/\mu_r \tag{2}$$

where:
  $\delta$ is a radial gap between a surface of the rotor mounted permanent magnets and the stator;
  $d_m$ is a radial thickness of the surface permanent magnets; and
  $\mu_r$ is the relative permeability of the permanent magnet material.

More generally, practical decoupling of the necessary AC waveforms can be obtained by a relaxed form of equation (1) as follows:

$$\delta_e/r_{si} \geq 0.2/\min(p,p_s) \tag{3}$$

Modeling of motor designs using the relaxed criteria of formula (3) for a rotating electric machine having p=1 and $p_s=2(\delta_e/r_{si} \approx 0.25)$ shows that back EMF may be reduced through field weakening by about 75% with only a 20% reduction in suspension force magnitude. By observing formula (1) the back EMF of the machine can be reduced by 75% with no change in the levitation force.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom", and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including", and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What we claim is:

1. An electrical drive system comprising:
   a rotating electric machine providing a rotor mounted for rotation with respect to a stator having electromagnetic windings; and
   a drive communicating with the rotating electric machine and providing electrical current to the electromagnetic windings to:
   (a) apply a suspending force to support the rotor against a non-torsional force having a direction independent of orientation of the rotor;
   (b) apply a torque force to the rotor to rotate the rotor;
   (c) produce a field weakening of a rotor magnetic field for rotor speeds above a predetermined rotor rotational speed;
   wherein the rotating electric machine provides physical measurements conforming to the following formula:

$$\delta_e/r_{si} \geq 0.2/\min(p, p_s)$$

where:
   $\delta_e$ is an effective air gap affecting the stator fields extending toward the rotor;
   $r_{si}$ is a radius of an inner stator bore;
   $\min(p, p_s)$ is a minimum of a number of pole pairs p and suspension pole pairs $p_s$ of the rotating electric machine as controlled by the drive.

2. The electrical drive system of claim 1 wherein the effective air gap is a gap of air needed to produce a same effect on the stator fields as that provided by the rotating electric machine assuming the structure outside of the effective air gap is a high relative permeability material having a relative permeability of greater than 20.

3. The electrical drive system of claim 1 wherein the rotor is a surface permanent magnet motor having magnets exposed on a face of the rotor facing the stator and wherein:

$$\delta_e = \delta + d_m/\mu_r$$

where:
   $\delta$ is a radial gap between a surface of the rotor mounted permanent magnets and the stator;
   $d_m$ is a radial thickness of the magnets; and
   $\mu_r$ is a relative permeability of a material of the permanent magnets.

4. The electrical drive system of claim 1 wherein the predetermined rotor rotational speed is a rotational speed of the rotor at a predetermined field drive voltage under a given load.

5. The electrical drive system of claim 1 wherein the field weakening force provides stator currents providing a magnetic field rotating with the rotor to reducing a magnetic field along a pole of the rotor as the rotor rotates.

6. The electrical drive system of claim 1 wherein the drive provides vector control of currents in the stator having D and Q components and wherein the field weakening controls the D component independently of the Q component.

7. The electrical drive system of claim 1 wherein the rotating electric machine has a pole architecture selected from the group consisting of a six slot stator and one pole pair rotor, a thirty-six slot stator and two pole pair rotor, and a twelve slot stator and four pole pair rotor.

8. The electrical drive system of claim 1 wherein the electrical machine is a motor and wherein the drive further (c) applies a torque to the rotor to rotate the rotor against a resisting load.

9. The electrical drive system of claim 1 wherein the rotating electric machine provides ancillary bearings supporting the rotor during rotation.

10. The electrical drive system of claim 1 wherein the rotating electric machine includes individual stator windings receiving an electrical power from the drive providing both the levitating force and field weakening.

11. A method of controlling a rotating electric machine of a type having a rotor mounted for rotation with respect to a stator having electromagnetic windings and conforming to the following formula:

$$\delta_e/r_{si} \geq 0.2/\min(p, p_s)$$

where:
$\delta_e$ is an effective air gap affecting the stator fields extending toward the rotor;
$r_{si}$ is a radius of an inner stator bore; and
$\min(p, p_s)$ is a minimum of a number of pole pairs p and suspension pole pairs $p_s$ of the rotating electric machine as controlled by a drive;
the method including:

(a) applying a levitating force to support the rotor against a radial force perpendicular to rotation of the rotor having a direction independent of rotation of the rotor; and (b) producing a field weakening of a rotor magnetic field for rotor speeds above a predetermined rotor rotational speed.

12. The method of claim 11 wherein the effective air gap is a gap of air needed to produce a same effect on the stator fields as that provided by the rotating electric machine assuming structure outside of the effective air gap is a high relative permeability material having a relative permeability of greater than 20.

13. The method of claim 11 wherein the rotor is a surface permanent magnet motor having magnets exposed on a face of the rotor facing the stator and wherein:

$$\delta_e = \delta + d_m/\mu_r$$

where:

$\delta$ is a radial gap between a surface of the rotor mounted permanent magnets and the stator;

$d_m$ is a radial thickness of the magnets; and $\mu_r$ is a relative permeability of a material of the permanent magnets.

14. The method of claim 11 wherein the predetermined rotor rotational speed is a rotational speed of the rotor at a predetermined field drive voltage under a given load.

15. The method of claim 11 wherein the field weakening force provides stator currents providing a magnetic field rotating with the rotor to reducing a magnetic field along a pole of the rotor as the rotor rotates.

16. The method of claim 11 wherein the field weakening controls a D component of a stator field independently of a Q component of the stator field.

17. The method of claim 11 wherein the rotating electric machine has a pole architecture selected from the group consisting of a six slot stator and one pole pair rotor, a thirty-six slot stator and two pole pair rotor and a twelve slot stator and four pole pair rotor.

18. The method of claim 11 wherein the electrical machine is a motor and further including (c) applying a torque to the rotor to rotate the rotor against a resisting load.

19. The method of claim 11 wherein the rotor provides ancillary bearings supporting the rotor during rotation.

20. The method of claim 11 wherein the rotating electric machine includes individual stator windings receiving an electrical signal from the drive providing both the levitating force and field weakening.

* * * * *